(12) United States Patent
Hiraguchi et al.

(10) Patent No.: US 12,466,974 B2
(45) Date of Patent: Nov. 11, 2025

(54) RESIN COATED METAL SHEET, CONTAINER, AND METHOD OF EVALUATION

(71) Applicant: JFE STEEL CORPORATION, Tokyo (JP)

(72) Inventors: Tomonari Hiraguchi, Tokyo (JP); Junichi Kitagawa, Tokyo (JP); Yuya Kawai, Tokyo (JP); Soichi Fujimoto, Tokyo (JP); Yasuhide Oshima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 933 days.

(21) Appl. No.: 17/627,201

(22) PCT Filed: Jul. 31, 2020

(86) PCT No.: PCT/JP2020/029382
§ 371 (c)(1),
(2) Date: Jan. 14, 2022

(87) PCT Pub. No.: WO2021/020548
PCT Pub. Date: Feb. 4, 2021

(65) Prior Publication Data
US 2022/0315794 A1 Oct. 6, 2022

(30) Foreign Application Priority Data
Jul. 31, 2019 (JP) .................. 2019-140453

(51) Int. Cl.
*C09D 167/03* (2006.01)
*B32B 15/08* (2006.01)
*B32B 15/09* (2006.01)
*B65D 65/40* (2006.01)
*C09D 167/02* (2006.01)

(52) U.S. Cl.
CPC ............ *C09D 167/03* (2013.01); *B32B 15/08* (2013.01); *B32B 15/09* (2013.01); *B32B 2363/00* (2013.01); *B32B 2439/00* (2013.01); *B65D 65/40* (2013.01); *C09D 167/02* (2013.01); *Y10T 428/31681* (2015.04); *Y10T 428/31786* (2015.04)

(58) Field of Classification Search
None
See application file for complete search history.

(56) References Cited

U.S. PATENT DOCUMENTS

| | | | | |
|---|---|---|---|---|
| 2005/0260456 A1* | 11/2005 | Hanai | .................. | G11B 5/7368 428/847.2 |
| 2005/0260459 A1* | 11/2005 | Hanai | .................... | G11B 5/733 428/840.2 |
| 2015/0141578 A1* | 5/2015 | Decorps | .................. | B29B 15/08 428/212 |
| 2018/0104930 A1* | 4/2018 | Lin | ..................... | B32B 38/0036 |
| 2023/0082644 A1* | 3/2023 | Kondratiuk | ............. | B32B 27/08 428/35.7 |
| 2023/0101851 A1* | 3/2023 | Kawai | .................... | B05D 3/007 106/287.26 |

FOREIGN PATENT DOCUMENTS

| | | | |
|---|---|---|---|
| JP | H05-331302 A | | 12/1993 |
| JP | 2002-160721 A | * | 6/2002 |
| JP | 2005-132072 A | * | 5/2005 |
| JP | 2010-105263 A | * | 5/2010 |
| JP | 2011-202156 A | | 10/2011 |
| JP | 2017-213884 A | | 12/2017 |
| JP | 2018-184508 A | | 11/2018 |
| JP | 2020-147751 A | * | 9/2020 |
| WO | 2016/147767 A1 | | 9/2016 |
| WO | WO 2022-172631 A | * | 8/2022 |

OTHER PUBLICATIONS

Sep. 29, 2020 International Search Report issued in International Patent Application No. PCT/JP2020/029382.

* cited by examiner

Primary Examiner — Vivian Chen
(74) Attorney, Agent, or Firm — Oliff PLC

(57) ABSTRACT

A resin coated metal sheet includes: a metal sheet; and a resin layer formed on at least one face of the metal sheet. A movable amorphous amount of the resin layer measured by a temperature modulated differential scanning calorimeter being 30% to 46%. An intensity ratio $I_{1,096}/I_{1,119}$ between intensity ($I_{1,096}$) of a peak attributable to a trans structure of methylene groups in polyethylene terephthalate (PET) around 1,096 cm$^{-1}$ determined from laser Raman spectroscopic analysis measured by making a plane of polarization of linearly polarized laser light incident on a thickness direction section of the resin coating layer perpendicularly to a thickness direction and intensity ($I_{1,119}$) of a peak attributable to a gauche structure of methylene groups in PET around 1,119 cm$^{-1}$ determined from the laser Raman spectroscopic analysis being 1.1 or more and less than 1.5 at a position with a distance of 1 μm from the metal sheet.

2 Claims, No Drawings

RESIN COATED METAL SHEET, CONTAINER, AND METHOD OF EVALUATION

FIELD

The present invention relates to a resin coated metal sheet, a container, and a method of evaluation.

Background

Various kinds of thermosetting resins have conventionally widely been applied to an inner face and an outer face of metal containers formed of tin free steel (hereinafter, referred to as TFS), aluminum, or the like to coat the surface thereof for the purpose of corrosion prevention. However, the method of coating using thermosetting resin requires a long time for drying coatings, thus causing problems in that productivity degrades, a large amount of energy is consumed, and a large amount of solvent is discharged. Given these circumstances, to solve these problems, many methods laminating thermoplastic resin on a metal sheet to coat it have been developed. Examples of the method for laminating thermoplastic resin on the metal sheet to coat it include a method heating the metal sheet subjected to various kinds of surface treatment such as plating treatment and thermally pressure bonding and laminating a thermoplastic resin film thereon.

Required for resin coated metal materials for container use are properties related to design such as appearance tone stability apart from basic properties such as workability, adhesion of coating resin, and corrosion resistance. In conventional metal sheets coated with polyester resin, during retort sterilization treatment, a phenomenon (hereinafter, referred to as retort whitening) in which the coating resin itself changes its color in a cloudy manner occurs. Retort whitening significantly impairs the design property of a container outer face and reduces consumer's purchase interest, and thus some improvement techniques are studied.

Specifically, as a method inhibiting retort whitening of resin coated metal sheets, Patent Literature 1 describes a method employing a resin composition containing a polyester resin having high crystallization rate. In this method, it is considered that many minute crystals are generated in a film during the retort sterilizing treatment, whereby retort whitening is inhibited. Patent Literature 2 describes a method performing heat treatment on a polyester resin coated metal sheet to control a crystal structure of a resin layer in a thickness direction. Furthermore, Patent Literature 3 describes a method performing heat treatment on a metal sheet coated with an unstretched polyester resin film to control a crystal structure of a resin layer in a thickness direction.

CITATION LIST

Patent Literature

Patent Literature 1: Japanese Patent Application Laid-open No. H05-331302

Patent Literature 2: Japanese Patent Application Laid-open No. 2010-105263

Patent Literature 3: Japanese Patent Application Laid-open No. 2017-213884

SUMMARY

Technical Problem

However, the method described in Patent Literature 1 has problems in that it is inferior in corrosion resistance to conventional polyester resins, and in addition, the coating resin is expensive. According to the method described in Patent Literature 2, the crystallization of the polyester resin proceeds to a large extent, and high adhesion currently demanded cannot be obtained, although retort whitening can be inhibited. According to the method described in Patent Literature 3, retort whitening cannot sufficiently be inhibited when the retort sterilization treatment is performed on harsh conditions such as high-temperature treatment and rapid cooling, which have been performed in recent years, although a balance between retort whitening and workability can be achieved.

The present invention has been made in view of the above problems. An object thereof is to provide a low-priced resin coated metal sheet having basic properties required for resin coated metal materials for container use and having retort whitening resistance in which a design property is not impaired even when subjected to retort sterilization treatment on harsh conditions and a container. Another object thereof is to provide a method for evaluating a retort whitening property of a resin coated metal sheet.

Solution to Problem

A resin coated metal sheet according to the present invention includes a metal sheet at least one face of which is coated with a resin layer, wherein a movable amorphous amount of the resin layer measured by a temperature modulated differential scanning calorimeter being 30% or more and 46% or less, and an intensity ratio $I_{1,096}/I_{1,119}$ between intensity ($I_{1,096}$) of a peak attributable to a trans structure of methylene groups in polyethylene terephthalate (PET) around $1,096$ cm$^{-1}$ determined from laser Raman spectroscopic analysis measured by making a plane of polarization of linearly polarized laser light incident on a thickness direction section of the resin coating layer perpendicularly to a thickness direction and intensity ($I_{1,119}$) of a peak attributable to a gauche structure of methylene groups in PET around $1,119$ cm$^{-1}$ determined from the laser Raman spectroscopic analysis being 1.1 or more and less than 1.5 at a position with a distance of 1 μm from the metal sheet.

The resin layer may include a polyester resin as a main component.

Resin in the resin layer may be a biaxially stretched polyester resin and contain polyethylene terephthalate in an amount of 90 mol % or more.

A container according to the present invention formed with the resin coated metal sheet according to the present invention, and the resin layer is formed on at least outer face side of the container.

A method of evaluation according to the present invention includes a step of predicting a retort whitening property of a resin coated metal sheet with a movable amorphous amount measured by a temperature modulated differential scanning calorimeter.

Advantageous Effects of Invention

The present invention can provide a low-priced resin coated metal sheet having basic properties required for resin coated metal materials for container use and having retort whitening resistance in which a design property is not impaired even when subjected to retort sterilization treatment on harsh conditions and a container. The present invention can provide an accurate method for evaluating a retort whitening property of a resin coated metal sheet.

DESCRIPTION OF EMBODIMENTS

The following describes a resin coated metal sheet according to the present invention in detail.

The following first describes a metal sheet for use in the present invention. As the metal sheet of the present invention, aluminum sheets, mild steel sheets, and the like, which are widely used as can materials, can be used. In particular, a surface treated steel sheet (hereinafter, referred to as TFS) formed with a two-layer film including metallic chromium as a lower layer and a chromium hydroxide as an upper layer or the like is the optimum. The deposition amount of a TFS film, which is not limited to a particular amount, is desirably 70 to 200 mg/m$^2$ for the metallic chromium layer and 10 to 30 mg/m$^2$ for the chromium hydroxide layer in terms of Cr for both from the viewpoint of post-processing adhesion and corrosion resistance.

The following describes a polyester resin layer having polyethylene terephthalate as a main component present on at least one face of the metal plate. The polyester resin layer of the present invention has polyethylene terephthalate as the main component. Having polyethylene terephthalate as the main component means being a polyester in which 90 mol % or more of structural units of the polyester are ethylene terephthalate units. The ethylene terephthalate units are more preferably 95 mol % or more. The ethylene terephthalate units being 95 mol % or more is preferred in uses in which heat resistance is required. Terephthalic acid as an acid component is essential for ensuring properties such as mechanical strength, heat resistance, and corrosion resistance; in addition, being copolymerized with isophthalic acid improves processability, adhesion, and the like. An isophthalic acid component is copolymerized in an amount of 5 to 10 mol % with respect to a terephthalic acid component, whereby deep drawability and post-processing adhesion improve, which is preferred.

Other dicarboxylic acid components and glycol components may be copolymerized to the extent that the above properties are not impaired. Examples of the dicarboxylic acid components include aromatic dicarboxylic acids such as diphenyl carboxylic acid, 5-sodium sulfoisophthalic acid, and phthalic acid; aliphatic dicarboxylic acids such as oxalic acid, succinic acid, adipic acid, sebacic acid, dimer acid, maleic acid, and fumaric acid; alicyclic dicarboxylic acids such as cyclohexane dicarboxylic acid; and oxycarboxylic acids such as p-oxybenzoic acid. Examples of the other glycol components include aliphatic glycols such as propanediol, butanediol, pentanediol, hexanediol, and neopentyl glycol; alicyclic glycols such as cyclohexane dimethanol; aromatic glycols such as bisphenol A and bisphenol S; and diethylene glycol and polyethylene glycol. Two or more kinds of these dicarboxylic acid components and glycol components may be used in combination. To the extent that the effects of the present invention are not impaired, a polyfunctional compound such as trimellitic acid, trimesic acid, or trimethylol propane may be copolymerized.

It is important for the polyester resin layer having polyethylene terephthalate as the main component of the present invention to have a movable amorphous amount determined from temperature modulated differential scanning calorimeter measurement of 30% or more and 46% or less. This requirement is the most important requirement in the present invention; the movable amorphous amount of the polyester resin layer with which the metal sheet has been coated is thus prescribed, whereby both retort whitening resistance and post-molding adhesion as the objects of the present invention can be achieved. The following states the reason for that.

The inventors of the present invention have earnestly studied the mechanism of retort whitening. A can is exposed to high-temperature water vapor from the start of retort sterilization treatment, and part of the water vapor penetrates an outer face side resin layer to reach the vicinity of an interface with a steel sheet. In an early stage of the retort sterilization treatment, the temperature of can contents is low, and thus when the water vapor having penetrated approaches the steel sheet, it condenses to produce water bubbles. It has been revealed that in a later stage of the retort sterilization treatment, the temperature of the can contents increases, the water bubbles produced within the film evaporate to become air bubbles and swell and thus remain as voids, and light is diffusely reflected by the void part, which gives a whitened appearance. It is known that polyester resin significantly varies in properties depending on whether it is crystalline or amorphous. It has been revealed that amorphous includes movable amorphous indicating glass transition and rigid amorphous not indicating glass transition, and to prevent retort whitening, it is effective to make the movable amorphous amount 46% or less. On the other hand, it has been revealed that post-molding adhesion degrades when the movable amorphous amount is extremely small, and the movable amorphous amount is required to be 30% or more. In addition, it has been revealed that a retort whitening property can be predicted by the value of the movable amorphous amount.

Furthermore, a crystal state near the interface between the metal sheet and the polyester resin is also an important requirement. The crystal state is evaluated by laser Raman spectroscopic analysis measured by making a plane of polarization of linearly polarized laser light incident on a thickness direction section of the polyester resin coating layer perpendicularly to a thickness direction. At a position of 1 μm from the metal sheet, peak intensity ($I_{1,096}$) around 1,096 cm$^{-1}$ attributable to a trans structure of a polyethylene terephthalate (PET) methylene group and peak intensity ($I_{1,119}$) around 1,119 cm$^{-1}$ attributable to a gauche structure of the same are measured. A ratio $I_{1,096}/I_{1,119}$ between these is required to be 1.1 or more and less than 1.5.

The molecular structure of PET includes the trans structure having high order of molecular chains and the gauche structure having low order thereof. It is estimated that when the trans structure is rich in a PET resin, the order of PET molecules is high as a whole. The presence ratio between the trans structure and the gauche structure is measured by the intensity ratio of a Raman spectrum, and order can be evaluated by the magnitude of this intensity ratio.

According to the present invention, a structure with higher order can be obtained in an area of a melted layer near the metal sheet in particular. The structure with higher order gives a higher water vapor barrier property during the retort and excellent retort whitening resistance. When the intensity ratio $I_{1,096}/I_{1,119}$ is less than 1.1 at the position with a distance of 1 μm from the metal sheet, the order of molecular chains is low, the water vapor barrier property is poor, and retort whitening resistance is poor. When the intensity ratio $I_{1,096}/I_{1,119}$ is 1.5 or more, adhesion between the metal sheet and the resin weakens owing to excessively high order of molecular chains, although retort whitening resistance is excellent.

Pigments are added to the resin coating layer of the present invention, whereby various tones can be imparted thereto. With incomplete concealment, a brilliant color utilizing a metallic luster of a base can also be imparted, and an excellent design property can be obtained. Furthermore, unlike printing on the surface of the resin, the pigments are directly added into the resin to impart colors, thus being free from a problem in that the tones fall even in a container molding process, and a favorable appearance can be maintained. In general, coating and printing are performed after container molding; a colored resin layer is formed, whereby part of the process can be omitted, and thus costs can be reduced, and organic solvents and the occurrence of carbon dioxide can be inhibited. The pigments to be added are required to exhibit an excellent design property after container molding; from such a viewpoint, examples thereof include inorganic pigments such as titanium dioxide and organic pigments such as anthraquinone-based ones, isoindolinone-based ones, benzimidazolone-based ones, quinophthalone-based ones, and condensed azo-based ones.

The resin layer when the organic pigments are added is preferably not an uppermost layer. Although the organic pigments are characterized by being unlikely to undergo bleeding to the surface of the resin layer even after passing through heat treatment such as during the retort sterilization treatment, a non-added layer with 0.5 μm or more is provided on the resin layer to which the pigments have been added, whereby bleeding out can surely be inhibited. The addition amount of at least one kind of anthraquinone-based, isoindolinone-based, benzimidazolone-based, quinophthalone-based, and condensed azo-based organic pigments is preferably 0.1 to 5% in terms of mass ratio with respect to the resin layer. This is because when the addition amount is less than 0.1%, coloration is poor, which is inappropriate, whereas when the addition amount is greater than 5.0%, transparency is poor, giving a tone lacking brilliantness.

The following describes a method for manufacturing the resin coated metal sheet for container use of the present invention.

The following first describes a method for manufacturing the resin layer with a multilayered structure with which the metal sheet is coated. The method for manufacturing the resin layer is not limited to a particular method. Raw material resin pellets are dried as needed, are then supplied to a known melt lamination extruder, are extruded from a slit-like die in sheet form, are brought into intimate contact with a casting drum, and are cooled and solidified to obtain an unstretched sheet, for example. This unstretched sheet is stretched in a longitudinal direction and a width direction of a film to obtain a biaxially stretched film. A stretch ratio can be set at any ratio in accordance with the degree of orientation, the strength, the elastic modulus, and the like of a target film; one by a tenter system is preferred in view of the quality of the film. Preferred are a sequential biaxial stretching system, in which stretching is performed in the longitudinal direction, and then stretching is performed in the width direction, and a simultaneous biaxial stretching system, in which stretching is performed in the longitudinal direction and the width direction substantially simultaneously.

The following describes a method for manufacturing the resin coated metal sheet by thermally fusion bonding (hereinafter, referred to laminating) the resin layer (the film) to the metal sheet. In the present invention, a method heating the metal sheet up to a temperature higher than the melting point of the film and bringing the resin film into contact with both faces thereof to laminate the resin film thereon using pressure bonding rolls (hereinafter, referred to as lamination rolls) can be used, for example. Laminating conditions may be set as appropriate such that the resin layer prescribed in the present invention will be obtained; the following describes an example of preferred manufacture conditions. A surface temperature of the metal sheet at the start of lamination may be the melting point (Tm) (° C.) of the resin layer to be in contact with the metal sheet or more. Specifically, the surface temperature of the metal sheet is controlled to be within a range of Tm of the resin layer to Tm+40° C. The surface temperature of the metal sheet is set at Tm of the resin layer or more, whereby the resin layer melts and wets the surface of the metal sheet, and favorable adhesion with the metal sheet can be ensured. The surface temperature of the metal sheet is set at Tm+40° C. or less, whereby the resin layer can be avoided from adhering to the lamination rolls owing to excessive melting of the resin layer, and a crystal structure of the resin layer as a surface layer can be controlled to be within the prescribed range of the present invention. The surface temperature of the metal sheet is preferably Tm to Tm+25° C. and more preferably Tm to Tm+15° C.

To control a crystal structure of an uppermost layer of the resin layer to be an appropriate condition, a surface temperature of the lamination rolls may be adjusted. Specifically, the surface temperature of the lamination rolls to be in contact with the resin layer is controlled to be within a range of Tg of the resin layer to Tg+80° C. Adjustment of a contact time (a nip time) with the lamination rolls is also an important factor. The nip time may be controlled to be within a range of 10 to 20 msec. The surface temperature and the contact time of the lamination rolls are adjusted to be within the above ranges, whereby the crystal structure of the resin layer prescribed in the present invention can be achieved. For the temperature adjustment of the lamination rolls, the inside of the rolls may be of a water-cooled type, for example. Cooling water is circulated within the rolls, whereby temperature control during film adhesion can be achieved.

Furthermore, heating is preferably performed for the resin layer before performing lamination. The resin layer is softened in advance, whereby temperature distribution within a resin layer section during lamination can be made more uniform. Thus, a crystal structure within the resin layer section has a mild structural change from the interface with the metal sheet to the surface layer, and thus more uniform performance can be exhibited. Specifically, the temperature of the resin layer before lamination may be controlled to be within a range of Tg to Tg+30° C. After the end of lamination, quenching (water cooling) is immediately performed to fix the crystal structure of the resin layer. A time until quenching may be limited to be within 1.0 second and is preferably within 0.7 second. The water temperature of quenching is at least Tg of the resin layer or less.

Subsequently, the manufactured laminated metal sheet is subjected to post-lamination heating. For the method of heating, any one such as an air-heating furnace, infrared rays, near-infrared rays, or an induction heater can be selected. Note that as heat treatment conditions, the post-lamination heating is desirably performed for less than 5 seconds at a temperature range of the crystallization temperature of the polyester resin layer or more and the melting point thereof or less. Short time heating with a total time of times for temperature rising to cooling of less than 5 seconds makes it easier to obtain a desired movable amorphous amount. In performing heat treatment with the air-heating furnace or the like, a target temperature is not necessarily reached in less than 5 seconds, and thus heating with infrared rays, near-infrared rays, or the induction heater is preferred. In heating with infrared rays or near-infrared rays, the arrangement of emitters or the output of the emitters are contrived, whereby heating uniformity of the metal sheet in the width direction and the longitudinal direction can be increased, which is thus more preferred. Furthermore, near-infrared rays are close to infrared absorption wavelengths of steel sheets and thus give high heating efficiency. To ensure short time heating, cooling may be performed after heating. The method of cooling is not limited to a particular method; water cooling may be performed like after lamination.

Although melt extrusion lamination, in which the surface of the metal sheet is coated with resin in a melted state, can also be used in the present invention, resin is formed into a film, and then the metal sheet is coated therewith, thereby making it easier to obtain a favorable crystal structure.

EXAMPLES

The following describes examples of the present invention.

[Method for Manufacturing Metal Sheet]

A steel sheet with a thickness of 0.18 mm and a width of 977 mm subjected to cold rolling, annealing, and temper rolling was subjected to degreasing, pickling, and chromium plating to manufacture a chromium plated steel sheet (TFS). For the chromium plating, after the chromium plating in a chromium plating bath containing $CrO_3$, $F^-$, and $SO_4^{2-}$ and intermediate rinsing, electrolysis was performed with chemical treatment liquid containing $CrO_3$ and $F^-$. In that process, electrolytic conditions (a current density, an electricity amount, and the like) were adjusted to adjust a metallic chromium deposition amount and a chromium hydroxide deposition amount to be 120 $mg/m^2$ and 15 $mg/m^2$, respectively, in terms of Cr.

[Method for Manufacturing Film for Resin Coating on Container Outside Face Side]

A polyester resin polymerized to have each of component ratios listed in Table 1 was dried and melted in accordance with a conventional manner, was coextruded with a T die, and was cooled and solidified on a cooling drum to obtain an unstretched film. Subsequently, the unstretched film was biaxially stretched and thermally fixed to obtain a biaxially stretched polyester film. In one case, the film remained unstretched and was denoted by unstretched in Table 1.

[Method for Manufacturing Resin Coated Metal Sheet for Container Use]

Using TFS (metallic Cr layer: 120 $mg/m^2$ and Cr oxide layer: 10 $mg/m^2$ in terms of metallic Cr), having T3CA with a thickness of 0.22 mm serving as the original sheet, as a metal sheet, both faces of TFS were coated with the resin film by thermal compression bonding lamination. Specific laminating conditions include a metal sheet temperature and a nip time listed in Table 1. Subsequently, after a lapse of 1 second from thermal compression bonding, the metal sheet was water cooled, after which water droplets on the surface were once removed, and was then subjected to post-lamination heating on conditions listed in Table 1. After leaving a heating furnace, the metal sheet was immersed in water tank storing 30° C. water for 3 seconds after a lapse of a time listed in Table 1 to be cooled, and then water droplets on the surface were again removed to obtain a resin coated metal sheet coated with a resin coating layer on both faces. Table 1 lists the properties of the obtained resin coated metal sheet.

[Evaluation of Resin Coated Metal Sheet for Container Use]

The following properties were measured and evaluated for the resin coated metal sheet and the coating resin layer obtained as in the foregoing. The following shows methods of measurement and evaluation.

(1) Movable Amorphous Amount of Polyester Resin

Using a thermal analysis apparatus "DSC Q100" manufactured by TA Instruments, specific heats before and after the glass transition point of a film after lamination or a film after heat treatment were measured at a temperature range of 0° C. to 200° C., a temperature rising rate of 2° C./min, an amplitude of 0.5° C., and a frequency of 40 Hz and in a nitrogen atmosphere, and a movable amorphous amount was calculated by Expression (1) shown below. Table 1 lists calculation results.

$$\text{Movable amorphous amount (\%)}=\{\Delta Cp/\Delta Cp(a)\}\times 100 \quad (1)$$

ΔCp: a specific heat difference between before and after the glass transition point after lamination or after heat treatment ΔCp(a): a specific heat difference between before and after the glass transition point of a completely amorphous substance (2) $I_{1,096}/I_{1,119}$ of Film Section at 1 μm Position from Metal Sheet Using RAMAN force of Nanophoton Corporation, peak intensity of a film section at a 1 μm position from the metal sheet was measured by laser Raman spectroscopic analysis. A laser wavelength was 532 nm, and a 100-power objective was used. A diffraction grating was 600 gr/mm, whereas a focal length was 550 mm. Table 1 lists the calculated $I_{1,096}/I_{1,119}$.

(3) Retort Whitening Resistance

The laminated metal sheet was punched in a disc shape and was fixed to the bottom of a commercially available can with a magnet. Subsequently, the can was placed in a water vapor type retort sterilization furnace with the can bottom directed downward, and retort sterilization treatment was performed at 125° C. for 90 minutes. After the treatment, an appearance change of the sample fixed to the can bottom was evaluated on the following criteria. Table 1 lists evaluation results.

⊚: No appearance change
◯: Very slight cloudiness present
Δ: Cloudiness present in appearance
X: Cloudiness in almost the entire appearance (the occurrence of whitening)

(4) Post-Molding Adhesion

Using a can after being formed, a peel test was performed with a tensile speed of 30 mm/min to evaluate adhesion per a width of 15 mm on the following criteria. An object to be evaluated was a can barrel on a can outer face. Table 1 lists evaluation results.

⊚: Completely no peeling
◯: Very slight peeling
Δ: Small extent of peeling
X: Complete peeling

[Evaluation]

As listed in Table 1, it has been revealed that the inventive examples have excellent retort whitening resistance and favorable other properties, whereas the comparative examples, which are out of the scope of the present invention, have inferior retort whitening resistance or other properties.

TABLE 1

| | | Resin composition PET or copolymerized PET | | | Resin layer | Laminating conditions | | Post-lamination heating |
|---|---|---|---|---|---|---|---|---|
| | | Polyethylene terephthalate mol % | Polyethylene isophthalate mol % | Film stretching | melting point ° C. | Metal sheet temperature ° C. | Nip time msec | Heating method |
| Comparative Example | 1 | 100 | 0 | Biaxial stretching | 253 | 257 | 18.3 | IR |
| Inventive Example | 2 | 100 | 0 | Biaxial stretching | 253 | 267 | 18.3 | IR |
| Inventive Example | 3 | 100 | 0 | Biaxial stretching | 253 | 270 | 18.3 | IR |
| Inventive Example | 4 | 100 | 0 | Biaxial stretching | 253 | 275 | 18.3 | IR |
| Inventive Example | 5 | 100 | 0 | Biaxial stretching | 253 | 267 | 23.1 | IR |
| Comparative Example | 6 | 100 | 0 | Biaxial stretching | 253 | 267 | 34.1 | IR |
| Inventive Example | 7 | 100 | 0 | Biaxial stretching | 253 | 267 | 18.3 | IR |
| Inventive Example | 8 | 100 | 0 | Biaxial stretching | 253 | 267 | 18.3 | IR |
| Comparative Example | 9 | 100 | 0 | Biaxial stretching | 253 | 267 | 18.3 | IR |
| Inventive Example | 10 | 100 | 0 | Biaxial stretching | 253 | 267 | 18.3 | IR |
| Inventive Example | 11 | 100 | 0 | Biaxial stretching | 253 | 267 | 18.3 | IR |
| Comparative Example | 12 | 100 | 0 | Biaxial stretching | 253 | 267 | 18.3 | IR |
| Comparative Example | 13 | 100 | 0 | Biaxial stretching | 253 | 267 | 18.3 | Air-heating furnace |
| Inventive Example | 14 | 96 | 4 | Biaxial stretching | 248 | 267 | 18.3 | IR |
| Comparative Example | 15 | 88 | 12 | Biaxial stretching | 225 | 267 | 18.3 | IR |
| Inventive Example | 16 | 100 | 0 | Biaxial stretching | 253 | 267 | 23.1 | IR |
| Inventive Example | 17 | 100 | 0 | Biaxial stretching | 253 | 267 | 18.3 | IR |
| Comparative Example | 18 | 100 | 0 | Un-stretched | 260 | 267 | 18.3 | IR |
| Comparative Example | 19 | 100 | 0 | Biaxial stretching | 253 | 267 | 23.4 | IR |
| Comparative Example | 20 | 96 | 4 | Biaxial stretching | 248 | 248 | 23.4 | IR |
| Comparative Example | 21 | 100 | 0 | Biaxial stretching | 253 | 267 | 18.3 | No heating |

| | | Post-lamination heating | | | Movable amorphous amount % | $I_{1,096}/I_{1,119}$ of film section at 1 μm position from metal sheet | Evaluation results | |
|---|---|---|---|---|---|---|---|---|
| | | Heating temperature ° C. | Temperature rising time sec | Time until start of cooling sec | | | Retort whitening resistance | Post-molding adhesion |
| Comparative Example | 1 | 180 | 1 | 3 | 29 | 1.50 | ◎ | X |
| Inventive Example | 2 | 180 | 1 | 3 | 41 | 1.35 | ◎ | ◎ |
| Inventive Example | 3 | 180 | 1 | 3 | 43 | 1.30 | ◎ | ◎ |
| Inventive Example | 4 | 180 | 1 | 3 | 46 | 1.10 | ○ | ◎ |
| Inventive Example | 5 | 180 | 1 | 3 | 40 | 1.20 | ◎ | ◎ |
| Comparative Example | 6 | 180 | 1 | 3 | 47 | 1.05 | X | ◎ |
| Inventive Example | 7 | 180 | 2 | 3 | 41 | 1.35 | ◎ | ◎ |
| Inventive Example | 8 | 180 | 1 | 4 | 38 | 1.37 | ◎ | ◎ |
| Comparative Example | 9 | 140 | 1 | 3 | 50 | 1.00 | X | ◎ |
| Inventive Example | 10 | 160 | 1 | 3 | 46 | 1.10 | ○ | ◎ |

TABLE 1-continued

| | | | | | | | | |
|---|---|---|---|---|---|---|---|---|
| Inventive Example | 11 | 170 | 1 | 3 | 40 | 1.37 | ◎ | ◎ |
| Comparative Example | 12 | 200 | 1 | 3 | 48 | 1.04 | X | ○ |
| Comparative Example | 13 | 180 | 14 | 3 | 27 | 1.55 | ◎ | X |
| Inventive Example | 14 | 180 | 1 | 3 | 42 | 1.33 | ◎ | ◎ |
| Comparative Example | 15 | 180 | 1 | 3 | 49 | 1.01 | X | ◎ |
| Inventive Example | 16 | 180 | 1 | 3 | 44 | 1.29 | ○ | ◎ |
| Inventive Example | 17 | 180 | 1 | 3 | 43 | 1.30 | ○ | ◎ |
| Comparative Example | 18 | 180 | 1 | 3 | 48 | 1.04 | X | ◎ |
| Comparative Example | 19 | 180 | 1 | 5 | 28 | 1.55 | ◎ | X |
| Comparative Example | 20 | 180 | 1 | 10 | 26 | 1.57 | ◎ | X |
| Comparative Example | 21 | No heating | | | 38 | 0.56 | X | ◎ |

INDUSTRIAL APPLICABILITY

The present invention can provide a low-priced resin coated metal sheet having basic properties required for resin coated metal materials for container use and having retort whitening resistance in which a design property is not impaired even when subjected to retort sterilization treatment on harsh conditions and a container. The present invention can provide an accurate method for evaluating a retort whitening property of a resin coated metal sheet.

The invention claimed is:

1. A resin coated metal sheet comprising
   a metal sheet, and
   a biaxially stretched polyester resin layer formed on at least one face of the metal sheet,
   wherein
   the resin layer contains at least 95 wt % polyethylene terephthalate (PET) and in the PET, 90 mol % or more of structural units are ethylene terephthalate units,
   a movable amorphous amount of the resin layer measured by a temperature modulated differential scanning calorimeter being 30% or more and 46% or less, and
   an intensity ratio $I_{1,096}/I_{1,119}$ between intensity ($I_{1,096}$) of a peak attributable to a trans structure of methylene groups in PET around 1,096 $cm^{-1}$ determined from laser Raman spectroscopic analysis measured by making a plane of polarization of linearly polarized laser light incident on a thickness direction section of the resin coating layer perpendicularly to a thickness direction and intensity ($I_{1,119}$) of a peak attributable to a gauche structure of methylene groups in PET around 1,119 $cm^{-1}$ determined from the laser Raman spectroscopic analysis being 1.1 or more and less than 1.5 at a position with a distance of 1 μm from the metal sheet.

2. A container formed with the resin coated metal sheet according to claim 1, wherein
   the resin layer is formed on at least outer face side of the container.

* * * * *